United States Patent Office 2,759,869
Patented Aug. 21, 1956

2,759,869

GERMICIDAL IODINE PREPARATIONS

Melville G. Sutton, Kew Garden Hills, N. Y., and Martin M. Reynolds, Drexel Hill, Pa., assignors to West Laboratories, Inc., Long Island City, N. Y., a corporation of New York No Drawing. Application January 5, 1952,
Serial No. 265,192

15 Claims. (Cl. 167—70)

The present invention is concerned with germicidal preparations of the type efficacious in relatively dilute aqueous solutions.

As conducive to a clear understanding of the invention, it is noted that since iodine has but slight solubility in water (0.29 gram per liter), much of it will promptly precipitate upon dilution with water from iodine solutions thereof in those common iodine solvents that are miscible with water such as acetone, ethyl alcohol, methyl alcohol, glycols and glycerols. Of course iodine will pass to not more than the above mentioned extent into water from solution in water-immiscible solvents such as carbon tetrachloride, benzene and ether. Most anionic and cationic surfactants tend to react with iodine, resulting in water insoluble products and so have proved to be generally unsatisfactory as iodine solvents.

It is among the objects of the invention to provide a germicidal preparation of the above type in the form of a powder, concentrate or solution that is economical, yet thoroughly efficacious, which incorporates as the main germicidal agent a large proportion of elemental iodine that is and remains stabilized to reactants generally, in aqueous solution of any dilution, and by the action of any microorganisms to which the preparation is applied, is promptly rendered effective, but substantially only to the minute extent necessary for germicidal action and is yet relatively non-toxic orally and dermatologically.

Though neither polypropylene oxide, nor polyethylene oxide, regardless of the degree of its polymerization, will solubilize iodine in water to any marked degree, the invention is based on the surprising discovery that certain chemical combinations of polypropylene and polyethylene oxides, may be rendered serviceable as unprecedentedly excellent water solubilizing agencies for elemental iodine.

More particularly, the invention is based upon the discovery that such utility resides in a class of non-ionic surfactants characterized by a hydrophobic group consisting of propylene oxide polymerized to polyoxypropylene glycols and then reacted with ethylene oxide, which latter are polymerized to hydrophylic groups of polyethylene oxide chains.

Compositions of the character set forth are a product of Wyandotte Chemicals Corporation of Wyandotte, Michigan, and are designated by the term "Pluronics," a term which in the interest of brevity will be hereinafter used in the specification to identify such compositions. These compositions have been disclosed and claimed in U. S. Patent No. 2,674,619, dated April 6, 1954, issued to Wyandotte Chemicals Corporation, and defined therein as compounds according to the formula.

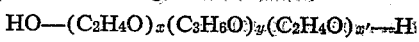

where $y$ equals at least 15; and $(C_2H_4O)_{x+x'}$ equals 20–90% of the total weight of the compound.

When it is attempted to effect solution of iodine in a liquid Pluronic by the application of heat, the iodine vaporizes in part, and the rest, far from entering into solution, combines chemically therewith to split the Pluronic molecule, impairing its solubility in water and its detergent action. When, on the other hand, it is attempted to dissolve large amounts of iodine in such Pluronic at low temperature by resort to agitation for instance, not only is the rate of solution too slow for commercial utility, but the resultant cloudiness generally occurring upon dilution in tap water suggests precipitation rather than solution.

If the iodine were once brought into solution in the Pluronic it would be released by contact with microorganisms and would not be inordinately taken up by organic foreign matter such as proteins, milk solids, milk serums, peptone cultures, agar, gelatin and the like that may be present in the medium to be germicidally treated. Any alkali in such medium would, however, combine very slowly with free iodine from the Pluronic environment and to that extent render the iodine unavailable for germicidal action.

According to one feature of the invention, the solution of a large proportion of elemental iodine by a Pluronic is brought to pass under heat, without objectionable chemical action or any of the untoward effects above noted, by the addition of an acid such as hydrochloric acid, that is inert to iodine and that acts to obviate the difficulties previously pointed out, though in a manner not understood by us. Such acid, moreover, combines with such organic foreign matter. Furthermore, it combines with such alkali and thereby serves to protect the iodine from being uselessly spent. Bearing in mind that only one part per million of iodine (1 p. p. m.) is required to kill microorganisms, the composition with its iodine content thus protected is highly economical.

In general, the acid used in dissolving iodine in liquid Pluronic should not be less than 2 per cent and not more than 3 per cent and preferably about 2.5 per cent by weight of the concentrate and the solution of the iodine should be effected in the Pluronic under agitation at a temperature of 45° C. to 75° C., preferably about 60° C.

For purposes of definition, the term "Halophor" has been coined and is hereafter used to define a compound that greatly increases the solubility of and tends to stabilize iodine in aqueous systems to reactants other than microorganisms.

"Halophor Index" is defined and hereinafter used to define the iodine capacity of the halophor or the maximum percentage by weight of iodine in the resultant halophor-iodine complex, that will give a clear solution in water at 22° C. to any dilution. The crystals of iodine precipitating from the solution indicates when the halophor index has been exceeded.

Pluronics are made in a wide variety of (1) the molecular weight of the hydrophobic group, and (2) its weight ratio to the hydrophylic group, which weight and ratio are controlled by the manufacturer to predetermine the desired characteristics, such as wetting action, detergency, foaming property and hygroscopicity, among other physical and chemical properties.

In general, iodine can, according to the present invention, be dissolved in any Pluronic. A small proportion of the iodine appears to become fixed as an iodide, but the major portion of the iodine remains available as such, apparently by solution in the hydrophobic group and is titratable as free iodine releasable from the composition as the active germicide.

Determinations thus far made have indicated that one of the Pluronics standardized by the manufacturer and designated "Pluronic L-62" (a concentrate essentially consisting of a definite predetermined molecular weight of the hydrophobic group, with a definite weight ratio to the hydrophylic group) dissolves and maintains in stable, aqueous solution when greatly diluted, a greater proportion of iodine than any other of the Pluronics tested or than any other solvent or composition heretofore known. In particular, Pluronic L-62 will dissolve 28 per cent by weight of iodine and thus has a halophor index of 28, and moreover has the further virtue of foaming but slightly. Pluronic L-62 is therefore in general preferred for purposes of the present invention although the other standardized Pluronics now available are also satisfactory, since they dissolve large proportions of iodine, Pluronic L-64 for instance having a halophor index of 16, Pluronic L-44 of 14, and Pluronic F-68, which is in solid or flaky form at room temperature, having a halophor index of 10. Pluronic L-62 is a liquid condensate of polypropylene oxide and ethylene oxide, the polypropylene oxide group having a molecular weight within the range of 1501 to 1800 and the condensate containing from 20 to 30 per cent by weight of ethylene oxide. Pluronic L-64 is a liquid condensate of polypropylene oxide and ethylene oxide, the polypropylene oxide group having a molecular weight within the range of 1501 to 1800 and the condensate containing from 40 to 50 per cent by weight of ethylene oxide. Pluronic L-44 is a liquid condensate of polypropylene oxide and ethylene oxide, the polypropylene oxide group having a molecular weight within the range of 1001 to 1200 and the condensate containing from 40 to 50 per cent by weight of ethylene oxide. Pluronic F-68 is a condensate of polypropylene oxide and ethylene oxide in the form of flakes, the polypropylene oxide group having a molecular weight within the range of 1501 to 1800 and the condensate containing from 80 to 90 per cent by weight of ethylene oxide.

In commercial practice, the germicidal preparation of the present invention is to be marketed in bottles or drums in very dilute aqueous solution, for which purpose 5 to 25 per cent, preferably about 10 to 15 per cent, of isopropyl-alcohol is included in the concentrate to assure easy and rapid dilution.

The use of distilled water as the diluent is economically unfeasible in most applications. While the use of soft tap water, and even of hard water, is feasible for the purpose, when the concentration of the composition as marketed considerably exceeds 1 per cent, resort to the preferred concentration to be marketed, of from .1 per cent to 1 per cent of the Pluronic-iodine complex in tap water, results in cloudiness, which renders the product unacceptable, even though such cloudiness does not detract from its efficacy as a germicide.

One of the characteristics of "Pluronics" is that under certain conditions of temperature and concentration in water, cloudy solutions result. The addition to such solution of a nonyl-phenol ethylene oxide that has preferably from about 8 to 9 mols of ethylene oxide per mol of nonyl-phenol which is sold by General Aniline & Film Corporation under the trade name "Antarox A-400," results in a clarification of the solution over a wide range of temperatures. In other words the addition of such Antarox A-400 to the composition greatly widens the range of dilution with ordinary tap water in which a clear solution is attained. For example, where a Pluronic iodine solution of a given concentration remains clear, say in the range of 20° to 50° C., the addition of sufficient Antarox A-400 would both decrease the lower limit of such temperature and increase the upper limit, say to cover a range in which the solution remains clear, at from 10° to 65° C. Or, for any given temperature, the addition of the Antarox A-400 component substantially decreases the dilution (generally in the ratio of approximately 10:1), in which no cloudiness will occur.

The use of Antarox A-400 as an additive, attains yet another advantage, in that it improves the objectionable clouding of the composition induced by the addition of special ingredients, such for instance, as anaesthetics, illustratively the anaesthetic Cycloform (isobutyl para-amino benzoate).

Anatrox A-400 is a single ring benzene compound with a polymer averaging eight ethylene oxide groups, each ethylene oxide group of the formula $O(CH_2CH_2O)-H$, attached in one position to the ring, and with iso-octyl or iso-nonyl in the meta position on the ring.

According to another feature of the invention, solid, water soluble compositions inert to iodine under conditions of use and that serve as protective agents for the iodine may be added in order (1) greatly to extend the halophor index, (2) to reduce the cost of the product, and (3) to render possible the preparation of the ultimate Pluronic iodine composition in the form of a stable, dry powder, rather than a concentrate. For this purpose, it is desirable to use (in order of preference) sodium acid sulphate, solid organic acid, preferably citric acid or urea. To attain a dry product, the proportion of such added ureanitrate, sodium acid sulphate, citric acid or urea should be 70 per cent or more of the final product.

A few examples will now be given of germicidal compositions according to the invention, the parts being by weight.

*Example I.—Concentrate for cleaning sanitary equipment*

|  | Parts |
|---|---|
| Pluronic L-62 | 44 |
| Hydrochloric acid (30% to 35%) | .5 to 3 |
|  | preferably 2 |
| Iodine | up to 17 |
| Isopropyl alcohol (99%) | 5 to 25 |
|  | preferably 15 |

To this composition may be added 5 to 25 parts, preferably 20 parts, of Antarox A-400. The concentrate thus prepared has a density of about 1.12 and a cost of little more than 50 cents per pound. 72 fluid ounces of the concentrate when added to 100 gallons of tap water, goes into solution very readily and makes a commercially saleable product of 0.6 per cent of concentrate in water.

For making the concentrate, the Pluronic, acid and iodine ingredients are mixed in a stainless steel kettle and heated to from 45° C. to 75° C., preferably to about 60° C., while agitating the mass until all the iodine is in solution, the heating expediting the solution and helping to stabilize the final product. After the iodine is all in solution, the Antarox A-400 may be added and the mixture then cooled to about 40° C., whereupon the isopropyl alcohol is added, the solution becoming homogeneous after about five minutes of mild agitation.

The Antarox A-400 would be omitted if the solution were sold in concentrations considerably exceeding 1 per cent or if the cloudiness were not objectionable for any particular use. Antarox A-400 in amount less than above indicated, would be less efficacious in avoiding cloud formation.

With an acid content of less than .5 per cent, a reduced proportion of the iodine is available as germicide and if the acid content is above 3 percent the cloud point is adversely affected. Control of the acid content thus avoids impairing the stability or efficiency and clarity of the final product.

The concentrate described will titrate 13 percent plus or 750 p. p. m. of free iodine, which is available for its germicidal action. If maintained at about 130° F. for more than three weeks, the iodine content will drop to about 500 p. p. m., primarily due to the much higher iodine vapor pressure at such temperature, and not to iodine reaction. It is therefore desirable to seal and store the commercial solution at room temperature.

The user would further dilute this solution, preparatory to use, to between 16 to 1 and 8 to 1, with an ultimate free iodine content of 30 to 60 p. p. m., which is adequate for the purpose. The composition even as diluted is substantially non-foaming.

Example II.—For topical application (first aid, cuts, abrasions, etc.)

| | Parts |
|---|---|
| Pluronic L-62 | 3 to 10 |
| | preferably 4.0 |
| Iodine | 1.0 to 4 |
| | preferably 1.5 |
| Hydrochloric acid (10%) | 0.1 to 5 |
| | preferably 0.5 |
| Antarox A-400 | 1 to 5 |
| | preferably 2.5 |
| Cycloform | 0.1 to 5 |
| | preferably 0.25 |
| Isopropyl alcohol | 5 to 25 |
| | preferably 10 |
| Distilled water | 60 to 100 |
| | preferably 80 |

The iodine content should of course not exceed the halophor index.

The Pluronic, iodine and acid are mixed as in Example I to dissolve the iodine.

The cycloform and Antarox A-400 are dissolved in isopropyl alcohol.

The two mixtures thus prepared are combined and maintained at 25° C. to 40° C., preferably at about 30° C., whereupon the distilled water is added.

One ounce of the solution to one cup of water provides an antiseptic wash.

One ounce of the solution to one quart of water provides a germicidal solution for sickroom utensils, feminine hygiene and the like.

Example III.—Rinse for dishes and kitchen utensils

| | Parts |
|---|---|
| Phosphoric acid (42%) | 45 to 75 |
| | preferably 60 |
| Pluronic L-62 | 25 to 45 |
| | preferably 35 |
| Pluronic L-64 | 25 to 45 |
| | preferably 35 |
| Iodine | 5 to 15 |
| | preferably 10 |
| Hydrochloric acid (conc.) | 1 to 4 |
| | preferably 2 |
| Isopropyl alcohol | 60 to 100 |
| | preferably 80 |
| Water | 600 to 900 |
| | preferably 780 |

With the use of the two different Pluronics above indicated, the solution remains substantially clear under high dilution even in the absence of any Antarox A-400.

The phosphoric acid serves essentially as a protective agent for the iodine by neutralizing alkalis and alkaline salts.

To prepare the concentrate, the two Pluronics are mixed with the iodine and hydrochloric acid and warmed to between 40° C. to 70° C., preferably to about 50° C., until the iodine is in solution. Upon cooling to room temperature, the isopropyl alcohol and the phosphoric acid are mixed in. The concentrate is finally diluted by the addition of the water.

Example IV.—Germicidal soap

| | Parts |
|---|---|
| Pluronic F-68 | 20 to 30 |
| | preferably 25 |
| Powdered soap stock | 20 to 30 |
| | preferably 25 |
| Iodine | 2 to 3 |
| | preferably 2.5 |
| Carbowax-6000 | 40 to 60 |
| | preferably 45 |
| Flowers of sulphur | 5 to 15 |
| | preferably 10 |

The Carbowax-6000 or polyethylene glycol of molecular weight of about 6000 solidifies the otherwise soft product, without detracting from the physical or chemical properties of the soap cake.

The flowers of sulphur serves to mask the otherwise objectionable brownish color imparted by the iodine.

The Pluronic F-68 which is a solid flake essentially of a predetermined molecular weight of the hydrophobic group and predetermined ratio of the hydrophylic group with respect thereto, is melted by heating to about 45° C., whereupon the iodine is dissolved by mixing therewith. Then the Carbowax in flake form is dissolved therewith, with additional heating if necessary. The resultant mass is then milled into the remaining components of the soap which is thereupon extruded in conventional manner to bar stock and cut into cakes.

The soap stock could be of any of numerous commercial types, preferably of low moisture content, such as the hard tallow type.

Example V.—Oral lozenges

Such lozenge prepared with any of the usual components of sugar, water and flavoring matter may have incorporated therein 1.0 to 5.0%, preferably about 3.0% of Pluronic F-68 which has incorporated therein, in the manner set forth in Example IV, 0.1 to 0.5, preferably 0.2% iodine, with the effective germicidal action noted and without impairing the taste or inducing any toxic effect.

Example VI.—Dry germicidal composition

| | Parts |
|---|---|
| Ureanitrate | 70 to 90 |
| | preferably 80 |
| Pluronic F-68 | 10 to 20 |
| | preferably 15 |
| Iodine | 2 to 10 |
| | preferably 5 |

The iodine is dissolved in Pluronic F-68 in manner similar to that of example IV and the resultant liquid is added to the ureanitrate, the mixture being comminuted after it solidifies upon cooling.

In this solid composition, the halophor index of iodine with respect to the Pluronic may be exceeded somewhat without ensuing serious consequences following dilution in water. However, it is in general preferred to keep the iodine content within the halophor index.

The foregoing composition is a free flowing dry powder and by reason of its large content of ureanitrate is of low cost.

While Pluronic F-68 is at present preferred, it is understood that other Pluronics which are solid at room temperature may be suitable for the purpose.

All of the compositions according to the present invention are readily soluble in any tap water to bring the Pluronic component with the free iodine therein into aqueous solution, without loss of iodine, but with ready and effective release in the presence of microorganisms of only so much iodine as is required for effective and economical germicidal action. The composition is non-toxic orally and dermatologically and loses no iodine either by precipitation or vaporization.

As many changes could be made in the above composition and method and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. A germicidal composition comprising a nonionic carrier-iodine complex in the form of a solution of iodine with the nonionic carrier wherein a portion of the total iodine is chemically bound to said carrier and the major portion of the total iodine is loosely bound to said carrier and titratable as free iodine, said carrier being a compound of the formula $$HO(C_2H_4O)_x(C_3H_6O)_y(C_2H_4O)_{x'}—H$$

where $y$ equals at least 15 and $(C_2H_4O)_{x+x'}$ equals 20 to 90% of the total weight of said compound, and the total iodine present in said complex being within a range having as a lower limit the amount to provide a germicidally effective quantity of loosely bound titratable iodine and as an upper limit about 28% by weight of said complex.

2. A germicidal composition as defined in claim 1, containing about 0.5 to 3% of an acid compatible with iodine and with said nonionic carrier.

3. A germicidal composition as defined in claim 1, containing about 0.5 to 3% of hydrochloric acid.

4. A germicidal composition as defined in claim 1 wherein the group $(C_3H_6O)_y$ has a molecular weight within the range 1501 to 1800.

5. A germicidal composition as defined in claim 1, wherein the group $(C_3H_6O)_y$ has a molecular weight within the range 1501 to 1800 and the groups $$(C_2H_4O)_{x+x'}$$

comprise 20% to 30% by weight of the compound.

6. A germicidal composition as defined in claim 1, wherein the group $(C_3H_6O)_y$ has a molecular weight within the range 1501 to 1800 and the groups $$(C_2H_4O)_{x+x'}$$

comprise 40% to 50% by weight of the compound.

7. A germicidal composition as defined in claim 1, wherein the group $(C_3H_6O)_y$ has a molecular weight within the range 1501 to 1800 and the groups $$(C_2H_4O)_{x+x'}$$

comprise 80% to 90% by weight of the compound.

8. A germicidal composition as defined in claim 1, containing in combination with said complex a lesser amount of a second complex of iodine with nonionic carrier, wherein the nonionic carrier is nonyl-phenol ethylene oxide condensate containing 8 to 9 mols of ethylene oxide per mol of nonyl-phenol.

9. A germicidal composition as defined in claim 8, wherein the carriers in said two complexes are present in proportions of about 5 to 25 parts of the second named carrier to each 44 parts of the first named carrier.

10. A germicidal composition as defined in claim 1, wherein said complex is associated with a water soluble diluent which is inert with respect to said complex.

11. A germicidal composition as defined in claim 10, wherein said diluent comprises isopropyl alcohol.

12. A germicidal composition as defined in claim 10, wherein said diluent is a solid.

13. A germicidal composition as defined in claim 12, wherein said solid diluent is one providing an acidic solution in water.

14. The method of preparing a complex of iodine and a nonionic carrier of the formula $$HO(C_2H_4O)_x(C_3H_6O)_y(C_2H_4O)_{x'}—H$$

where $y$ equals at least 15 and $(C_2H_4O)_{x+x'}$ equals 20 to 90% of the total weight of said carrier, that comprises mixing said carrier with an amount of elemental iodine to provide not more than about 28% iodine in the resulting complex in the presence of an acid which is inert to iodine, and agitating the mass while heating to a temperature of about 45° to 75° C. until all the iodine is dissolved.

15. The method of preparing a complex of iodine and a nonionic carrier of the formula $$HO(C_2H_4O)_x(C_3H_6O)_y(C_2H_4O)_{x'}—H$$

where $y$ equals at least 15 and $(C_2H_4O)_{x+x'}$ equals 20 to 90% of the total weight of said carrier with an amount of elemental iodine to provide not more than about 28% iodine in the resulting complex in the presence of hydrochloric acid, and agitating the mass while heating to a temperature of about 60° C. until all the iodine is dissolved.

References Cited in the file of this patent

UNITED STATES PATENTS

| | | |
|---|---|---|
| 1,429,276 | Davis | Sept. 19, 1922 |
| 1,557,266 | Moore | Oct. 13, 1925 |
| 2,213,477 | Steindorff et al. | Sept. 3, 1940 |
| 2,275,979 | Molnar | Mar. 10, 1942 |
| 2,385,394 | Witte | Sept. 25, 1945 |
| 2,425,845 | Toussaint et al. | Aug. 19, 1947 |
| 2,550,622 | Taub | Apr. 24, 1951 |
| 2,599,140 | Taub | June 3, 1952 |

OTHER REFERENCES

U. S. Dispensatory, 24th ed., 1947, Lippincott Co., Philadelphia, Pa., page 573.

Chemical Abstracts, vol. 44, 1950, page 11130a.

Chemical and Eng. News, February 19, 1951, vol. 29, page 664.